(12) United States Patent
Schluchter et al.

(10) Patent No.: US 7,251,039 B1
(45) Date of Patent: Jul. 31, 2007

(54) LOW NON-LINEAR ERROR DISPLACEMENT MEASURING INTERFEROMETER

(75) Inventors: William Clay Schluchter, Los Altos, CA (US); Robert Todd Belt, Mountain View, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 192 days.

(21) Appl. No.: 11/118,949

(22) Filed: Apr. 29, 2005

(51) Int. Cl.
*G01B 9/02* (2006.01)
(52) U.S. Cl. ...................................... 356/487; 356/491
(58) Field of Classification Search ................ 356/484, 356/486, 487, 491, 492; 359/577, 583
See application file for complete search history.

(56) References Cited

U.S. PATENT DOCUMENTS

| | | | | |
|---|---|---|---|---|
| 5,064,280 A | * | 11/1991 | Ringens et al. ............ 356/28.5 |
| 5,677,768 A | * | 10/1997 | Bockman ..................... 356/487 |
| 6,542,247 B2 | * | 4/2003 | Bockman ..................... 356/493 |
| 6,631,004 B1 | * | 10/2003 | Hill et al. .................... 356/487 |
| 2005/0008322 A1 | * | 1/2005 | Sullivan et al. ............. 385/147 |

* cited by examiner

Primary Examiner—Layla G. Lauchman
Assistant Examiner—Michael A. Lyons
(74) Attorney, Agent, or Firm—Thomas F. Woods

(57) ABSTRACT

An interferometer is provided that minimizes the introduction of non-linear errors into displacement measurements. In one embodiment, non-linear errors are reduced by isolating reference and measurement beams over most of their respective optical paths leading to the detector, and by employing a separate amplitude-splitting non-polarizing optical beam splitter for each beam input into the interferometer. Additionally, the interferometer is scalable to an arbitrary number of optical axes or inputs.

18 Claims, 4 Drawing Sheets

LOW NON-LINEAR ERROR DISPLACEMENT MEASURING INTERFEROMETER

NOTICE OF POTENTIAL MILITARY APPLICATIONS

The inventors believe that the present invention described herein may be particularly well-suited to certain military applications.

BACKGROUND

Displacement measuring interferometers ("DMIs") are well known in the art, and have been used to measure small displacements and lengths to high levels of accuracy and resolution for several decades. Among such devices, helium-neon displacement measuring laser interferometers have enjoyed relatively widespread application owing to their high degree of stability and monochromaticity. Interferometers require careful alignment of mirrors that must be sustained over extended periods of time, however, which can present considerable practical difficulties.

A double-pass interferometer may be rendered partially insensitive to mirror misalignments by double-passing each arm of the interferometer and incorporating a means of inverting the wavefronts between passes. See, for example, "A Double-Passed Michelson Interferometer" by S. J. Bennett in Optics Communications, Volume 4, number 6, February/March, 1972, where double-passing is achieved using a polarized beam-splitter, two quarter-wave plates and a cube-corner reflector that serves as an inverting component. The entirety of the foregoing paper by Bennett is hereby incorporated by reference herein. In consequence of their commercial viability, robustness, stability and accuracy, double-pass displacement measuring interferometers find relatively common use in high accuracy displacement measurements.

Despite the many advances that have been made in the field of DMIs generally, however, measurement errors and inaccuracies persist. Among the factors contributing to such errors and inaccuracies are alignment errors and path length errors, optical mixing, thermal effects, polarization leakage (or the unintended mixing of measurement and reference beams), diffraction-induced fringing, non-linear relationships between phase and displacement, and other errors. See, for example, "Recent Advances in Displacement Measuring Interferometry" by Norman Brobroff in Meas. Sci. Technol. 4 (1993) 907-926, and "An Investigation of Two Unexplored Periodic Source Errors in Differential-Path Interferometry" by Schmitz and Beckwith in Precision Engineering 27 (2003) 311-322, where some of these factors are discussed in detail. The respective entireties of the foregoing papers by Broboff and Schmitz et al. are hereby incorporated by reference herein.

Most DMIs in the prior art combine reference and measurement beams before they are presented to the optical portion of an interferometer system. The non-ideal characteristics of the source and optics result in mixing of the reference and measurement beams before the desired displacement is measured. This is one of the principal means by which non-linear errors are introduced in DMIs. Another principal source of non-linear error in DMIs is diffraction-based interference. Some prior art DMIs employ a reflective aperture to separate a reference beam from a measurement beam, the two beams sharing a common annulus up to the reflective aperture. The result of such an architecture is that an interference beam is formed, which can degrade performance.

In a paper presented at the Annual Meeting of the ASPE in 2001 entitled "Demonstration of Sub-Angstrom Cyclic Non-Linearity Using Wavefront-Division Sampling with a Common-Path Laser heterodyne Interferometer," Feng Zhao of the Jet Propulsion Laboratory, California Institute of Technology, Pasadena, Calif. discloses a common-path heterodyne interferometer that attempts to minimize non-linear errors. Zhao isolates the reference and measurement beams over most of the optical path to the detector by using separate fiber optic channels for the reference and measurement beams. The reference beam has a first frequency and the measurement beam has a second frequency different from the first frequency. In rough terms, first and second beams corresponding to the first and second frequencies are generated and measured at separate first and second detectors. In some systems, however, things are more complicated than this. Instead, so-called "local oscillator" and "probe" beams are emitted by the source as two separate beams, the beams being mixed in the interferometer to produce measurement and reference beams at the output. This topic is discussed in further detail below. Also see FIG. 8. For purposes of clarity and to avoid confusion, the terms "measurement beam" and "reference beam" are employed herein, but are to be understood as potentially being interchangeable with the terms "local oscillator beam" and "probe beam," respectively, depending upon the particular context in which either term may appear.

The first beam is a reference beam produced by means of the first frequency beam impinging upon a stationary aperture. The second beam is a measurement beam produced by the second frequency beam impinging upon a moving target. The phase difference between the first and second beams represents the position of the target. Zhao's interferometer architecture reduces non-linear errors in measured displacements. Zhao employs a wavefront division scheme, however, in which diffraction-based interference errors remain important because measurement and reference beams are annularly spaced apart from one another over essentially the same optical path. Moreover, it is not clear how Zhao's approach could be expanded to more than one optical axis.

What is needed is a DMI that further minimizes non-linear and diffraction-induced errors, and that may be scaled up or down over multiple optical axes in a straightforward and economic manner.

SUMMARY OF THE INVENTION

In accordance with one aspect of the present invention, reference and measurement beams are directed parallel to one another in a non-coaxial manner into an optical portion of an interferometer parallel, the beams not being annularly spaced from one another, to thereby reduce diffraction-induced errors.

In accordance with another aspect of the present invention, reference and measurement beams are isolated from one another over significant portions of their respective optical paths and are delivered to spatially separate amplitude-splitting polarizing or non-polarizing input rhombs to reduce interference effects and attendant non-linearities.

In accordance with yet another aspect of the present invention, an interferometer is provided that may be scaled to an arbitrary number of optical axes in a compact form.

In accordance with still another aspect of the present invention, an interferometer assembly is provided that recombines measurement and reference beams but that does not split such beams, resulting in no or minimal phase change of the reference beam on its way to the detector.

BRIEF DESCRIPTIONS OF THE DRAWINGS

DETAILED DESCRIPTIONS OF THE PREFERRED EMBODIMENTS

Figure 1:
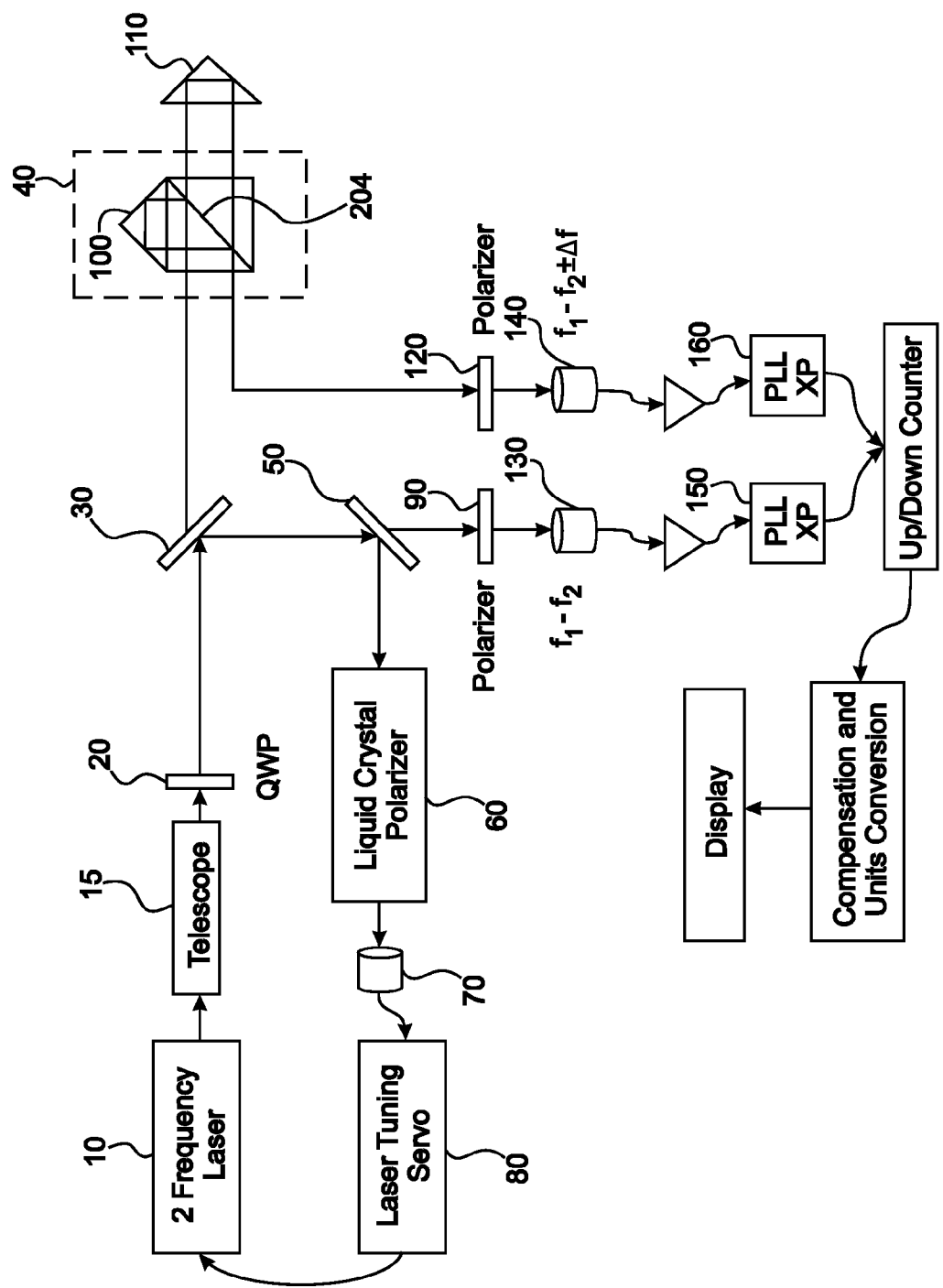
FIG. 1 shows a block diagram of a linear displacement measuring interferometer of the prior art.

FIG. 1 shows a block diagram of a linear displacement measuring interferometer of the prior art. A dual-frequency Zeeman split helium-neon laser source 10 generates and emits first and second beams having frequencies $f_1$ and $f_2$, where the first beam has a first circular polarization state and the second beam has a second circular polarization state different from the first polarization state (hereafter "beams $f_1$ and $f_2$"). Beams $f_1$ and $f_2$ emitted from source 10 are typically right- and left-rotationally polarized, respectively. Two laser modes are amplified in a cavity of source 10, the two modes corresponding to the two polarization states. In a Zeeman split laser, the two polarizations are circular and of opposite-handedness. Telescope 15 provides means for expanding and collimating beams $f_1$ and $f_2$ emitted by source 10 for delivery to the remainder of the interferometry system.

Beams $f_1$ and $f_2$ next pass through quarter wave plate 20, where they are transformed from circularly-polarized states to linearly-polarized states and then directed to non-polarizing beam splitter 30. (Note that means for appropriately aligning the linearly polarized beams with the plane of incidence of polarized beam splitter 204 or "PBS 204" are not shown in FIG. 1.)

Once the linearly polarized beams are appropriately aligned with the plane of incidence of polarized beam splitter 204 of interferometer 40, beam $f_1$ is transmitted to measurement cube corner 110, while beam $f_2$ is reflected to reference cube corner 100. After beams $f_1$ and $f_2$ are retro-reflected from their respective cube corners 100 and 110, beams $f_1$ and $f_2$ are recombined at polarized beam splitter 204 (or "PBS 204"). Interferometer 40 receives the transmitted portions of linearly polarized beams $f_1$ and $f_2$, and then directs respective portions of such beams to reference cube corner 100 and measurement cube corner 110.

Beams $f_1$ and $f_2$ reflected from reference cube corner 100 and measurement cube 110 are directed through second 45-degree polarizer 120. First and second 45-degree polarizers 90 and 120, respectively, recombine measurement and reference beams $f_1$ and $f_2$. Outputs from phase detectors 130 and 140 are input to phase lock loop detectors 150 and 160, which together yield a difference $\Delta f$, from which is determined the displacement measurement cube corner 110 has moved. Recombined beams $f_1$ and $f_2$ pass through polarizer 120, which leads to interference between the two orthogonally-polarized beams. The resulting interference beam is transmitted by polarizer 120 to photodiode 140 for detection. The frequency of the resulting interference beam corresponds to the relative velocity along the axis of the measurement beam of measurement cube corner 110 in respect of reference cube corner 110. The phase of the interference beam corresponds to the relative position of measurement cube corner 110 along the axis of the measurement beam.

Continuing to refer to FIG. 1, upon emerging from quarter wave plate 20, a portion of each of beams $f_1$ and $f_2$ is transmitted through beam splitter 30 in the direction of interferometer 40 (which is the optical portion of the interferometer system). The remaining portions of each of beams $f_1$ and $f_2$ are reflected towards non-polarizing beam splitter 50 and first 45-degree polarizer 90. Liquid crystal polarizer 60, power detector 70 and laser tuning servo 80 comprise feedback control means for monitoring and controlling the constancy of the output of laser source 10. For stability, the laser cavity of source 10 is temperature controlled using feedback from the power balance of the two laser modes produced by source 10. A portion of the beam delivered though non-polarizing beam splitters 30 and 50 is directed to liquid crystal polarizer 60, which alternately transmits light having first and second polarization states. Photodiode 70 measures the power balance over time and provides such information to laser tuning servo 80.

FIG. 1 and the accompanying description set forth herein describe aspects of Agilent's Model Number 10705 Linear Interferometer. The 10705 Linear Interferometer has a monolithic design and structure.

Note that as employed in the specification, drawings and claims hereof, and in the context of discussing, describing and/or claiming a DMI, a portion of a DMI or a DMI system, the term "monolithic" means an interferometer having at least polarizing or non-polarizing beam splitter sub-assembly comprising glass or an optically equivalent material and at least one cube corner, input, output, reflecting or retro-reflecting rhomb sub-assembly, also comprising glass or an optically equivalent material, where the beam splitter and the at least one cube corner, input, output, reflecting or retro-reflecting rhomb sub-assembly are physically located adjacent to one another, and are attached directly to one another by adhesive, mechanical, chemical, electromagnetic and/or magnetic means such that the optical portion of the interferometer (which does not include the source, the detectors or the measurement cube or plane mirror of a DMI or DMI system), forms a single assembly.

Aspects of the DMI illustrated in FIG. 1 are disclosed in the following U.S. patents, the respective entireties of which are hereby incorporated by reference herein: U.S. Pat. No. 5,064,280 to Bockman entitled "Linear-and-angular measuring plane mirror interferometer;" U.S. Pat. No. 6,542,247 to Bockman entitled "Multi-axis interferometer with integrated optical structure and method for manufacturing rhomboid assemblies;" and U.S. Pat. No. 5,667,768 to Bockman entitled "Method and interferometric apparatus for measuring changes in displacement of an object in a rotating reference frame."

To avoid confusion, note that the term "reference beam" as employed in the specification, drawings and claims hereof, and in the context of discussing, describing and/or claiming a DMI, a portion of a DMI or a DMI system, depending upon the particular context in which it is employed, may mean "local oscillator beam" or "reference beam." Note further that the term "measurement beam" as employed in the specification, drawings and claims hereof, and in the context of discussing, describing and/or claiming a DMI, a portion of a DMI or a DMI system, depending upon the particular context in which it is employed, may mean "probe beam" or "measurement beam."

In accordance with some embodiments of the present invention "local oscillator" and "probe" beams are emitted by the source, the local oscillator and reference beams being mixed within the interferometer to produce measurement and reference beams at the output. Although for the sake of simplicity we continue to refer to "reference beams" and "measurement beams" below, those terms are to be interpreted as set forth in the immediately foregoing paragraph, depending upon the particular context in which they appear.

Figure 2:
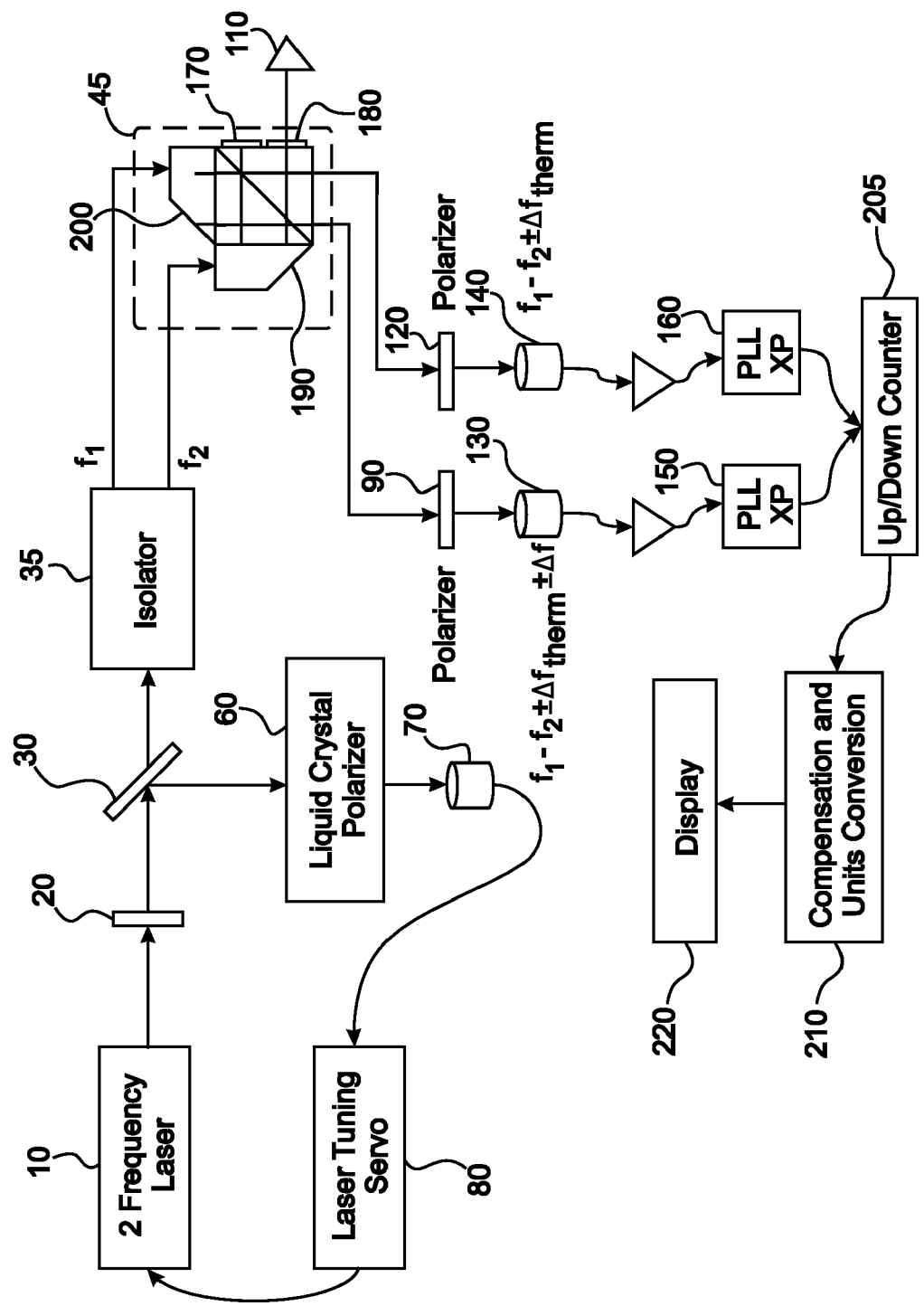
FIG. 2 shows a block diagram of one embodiment of a linear displacement measuring interferometer of the present invention.
Figure 4:
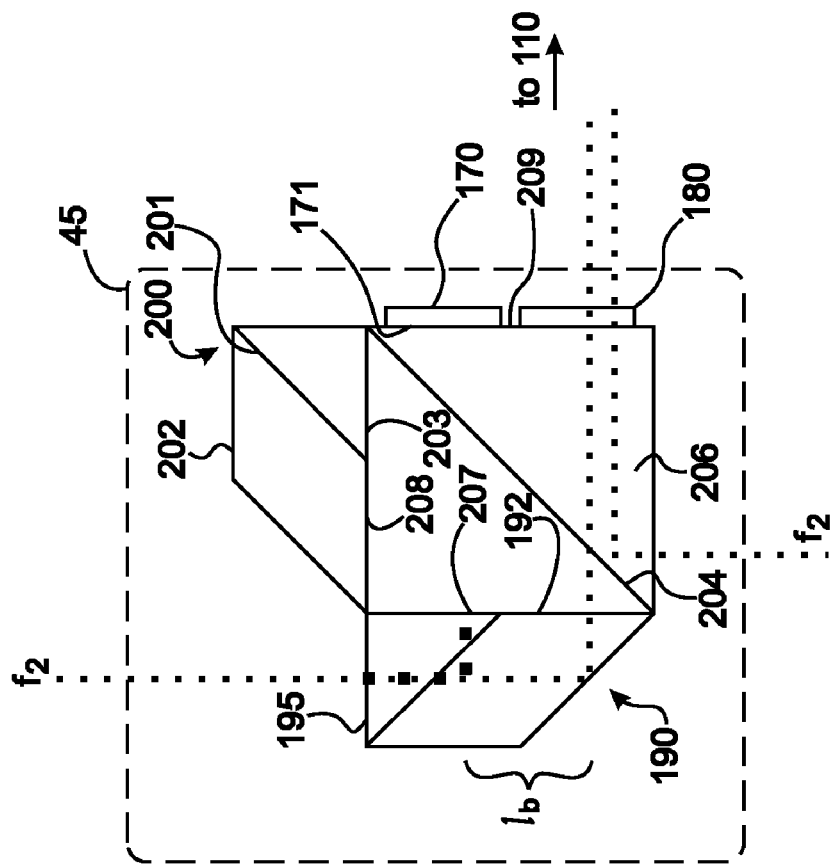
FIG. 4 shows one embodiment of an amplitude-splitting non-polarizing beam splitter of the present invention, and the optical path taken by a measurement beam having frequency $f_2$ therethrough.
Figure 3:
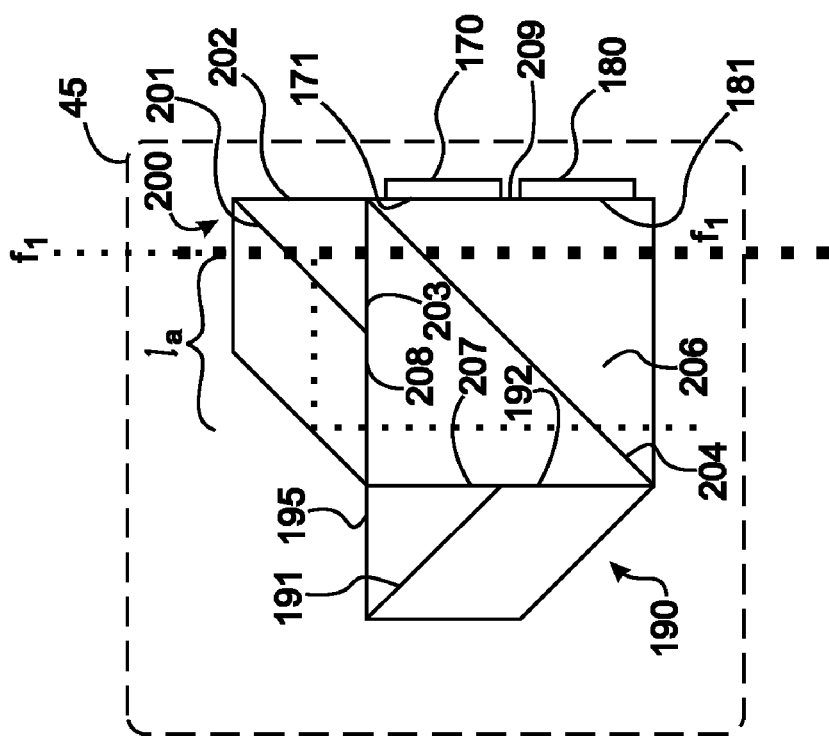
FIG. 3 shows one embodiment of an amplitude-splitting non-polarizing beam splitter of the present invention, and the optical path taken by a reference beam having frequency $f_1$ therethrough.

FIGS. 2, 3 and 4 show various aspects of one embodiment of a linear or single-pass displacement measuring interferometer of the present invention.

Referring to FIG. 2, dual frequency laser source 10 generates and emits first and second beams having frequencies $f_1$ and $f_2$ (hereafter "beams $f_1$ and $f_2$"). First beam $f_1$ is in a first circular polarization state and second beam $f_2$ is in a second circular polarization state different from the first polarization state, where beams $f_1$ and $f_2$ are generally orthogonally polarized in respect of one another. First and second beams $f_1$ and $f_2$ next pass through quarter wave plate 20, where they are transformed into first and second linearly polarized beams $f_1$ and $f_2$.

Next, first and second linearly polarized beams $f_1$ and $f_2$ pass through non-polarizing beam splitter 30, where a portion of the energy of each beam is transmitted through beam splitter 30 in the direction of isolator 35, and the remaining portion of the energy of each beam is reflected to liquid crystal polarizer 60, power detector 70 and laser tuning servo 80 (which, as in FIG. 1, are employed as feedback control means to monitor and control the constancy of laser source 10's output).

In one embodiment, isolator 35 comprises a polarizing beam splitter in series with a fiber optic delivery and collimation system, the system splitting and isolating first and second beams $f_1$ and $f_2$ from one another over a major portion of their respective optical path lengths between isolator 35 and interferometer 45. Isolator 35 and some of its various components are described in pending U.S.

Optically separated first and second beams $f_1$ and $f_2$ are next delivered to interferometer 45, which in one embodiment of the present invention comprises two input beam amplitude-splitting, non-polarizing, beam splitter sub-assemblies 200 and 190. Measurement cube corner 110 retro-reflects measurement beam $f_2$ incident thereon and originating from interferometer 45.

In the embodiment of the present invention shown in FIGS. 2, 3 and 4, quarter wave plates 170 and 180 are incorporated into interferometer 45. Quarter wave plate 170 features a mirrored reflecting surface, while quarter wave plate 180 has no mirrored surface. As a result, a linearly-polarized beam incident upon plate 170 is transformed into a circularly-polarized state, whereas a linearly-polarized beam incident upon plate 180 remains linearly-polarized.

Input beam amplitude-splitting non-polarizing rhomb sub-assemblies 190 and 200 may be constructed in accordance with the teachings of U.S. Pat. No. 6,542,247 to Bockman entitled "Multi-axis interferometer with integrated optical structure and method for manufacturing rhomboid assemblies." In the embodiment of the present invention illustrated in FIGS. 2, 3 and 4, one rhomb sub-assembly is provided for each input reference and measurement beam. The two output beams provided by interferometer 45 shown in FIGS. 2, 3 and 4 preferably have equal powers, the reference beam being vertically-polarized, the measurement beam being horizontally-polarized.

The reference and measurement beams output by interferometer 45 are next directed through respective 45-degree polarizers 90 and 120 such that they emerge therefrom sharing a common polarization state. Outputs from phase detectors 130 and 140 are input to phase locked loop detectors 150 and 160, which in combination with up/down counter 200 yield a difference $\Delta f$, from which may be determined the distance or displacement that measurement cube corner 110 has moved respecting interferometer 45. The reference beam or channel output is used to measure the common drift of the system, which is typically dominated by isotropic thermal drift, or $\Delta f_{therm}$. The quantity $\Delta f_{therm}$ is preferably subtracted from each measurement channel or beam. FIG. 3 and FIG. 4 show further details of interferometer 45.

FIG. 3 shows the optical path of reference beam $f_1$, while FIG. 4 shows the optical path of measurement beam $f_2$. Path lengths $I_a$ and $I_b$ are nominally equal in length, and thus no differential change in path length occurs when the scale of interferometer 45 changes with temperature. Reference and measurement beams $f_1$ and $f_2$ undergo additional optical path lengths equivalent to one length of polarizing beam splitter sub-assembly 206, plus twice the optical path lengths through quarter wave plates 170 and 180. Accordingly, when the scale of the interferometer 45 changes with temperature, the respective path lengths of reference and measurement beams $f_1$ and $f_2$ change by equal amounts, resulting in an athermal design.

Continuing to refer to FIGS. 3 and 4, interferometer 45 comprises first input rhomb sub-assembly 200 having first input surface 201 and first output surface 203, with first amplitude-splitting non-polarizing interface 202 being disposed therewithin. Second input rhomb sub-assembly 190 comprises second input surface 191 and second output surface 192, with second amplitude-splitting non-polarizing interface 195 being disposed therewithin. Polarizing beam splitter sub-assembly 206 comprises at least first, second and third faces 207, 208 and 209, respectively, and includes polarizing beam splitter interface 204 located therewithin. Polarizing beam splitter interface 204 preferably comprises an immersed polarizing beam splitting coating, or a dielectric coating sandwiched between two layers of optical glass, the coating being capable of selectively polarizing light beams incident thereupon. First quarter wave plate 170 has first input face 171, while second quarter wave plate 180 has second input face 181.

First output surface 203 of first input rhomb sub-assembly 200 is attached to first face 208 of beam splitter sub-assembly 206, preferably by means of optically-transparent or substantially optically transparent adhesive or glue. Second output surface 192 of second input rhomb sub-assembly 190 is attached to second face 207 of beam splitter sub-assembly 206, also preferably by means of optically-transparent or substantially optically transparent adhesive or glue. First and second input faces 171 and 181 of first and second quarter wave plates 170 and 180 are attached to third face 209 of beam splitter sub-assembly 206, again preferably by means of optically-transparent or substantially optically transparent adhesive or glue.

Input rhomb sub-assemblies 200 and 190, quarter wave plates 170 and 180, and beam splitter sub-assembly 206 are configured and attached to one another to permit first beam $f_1$ and second beam $f_2$ to enter interferometer assembly 45 separately through first and second input surfaces 191 and 201, first and second amplitude-splitting interfaces 202 and 195 splitting and reflecting portions of the first and second beams $f_1$ and $f_2$.

Input rhomb sub-assemblies 200 and 190, polarizing beam splitter sub-assembly 206, and quarter wave plates 180 and 190 each preferably comprise stacks of appropriately machined (or otherwise formed) and coated glass plates or components as described in U.S. Pat. No. 6,542,247 to Bockman. In preferred embodiments of the present invention, each of amplitude-splitting non-polarizing input rhomb sub-assemblies 200 and 190 is formed by adhering or gluing two pieces of glass together, with the adhesive or glue interface forming the amplitude-splitting interfaces thereof.

As mentioned above, faces 203 and 208, 192 and 207, 171 and 209, and 181 and 209 of such sub-assemblies are preferably glued to one another, also as described in U.S. Pat. No. 6,542,247 to Bockman. Accordingly, and consistent with the definition of the term "monolithic" set forth hereinabove, interferometer 45 shown in FIGS. 2, 3 and 4 is monolithic.

Figure 5:
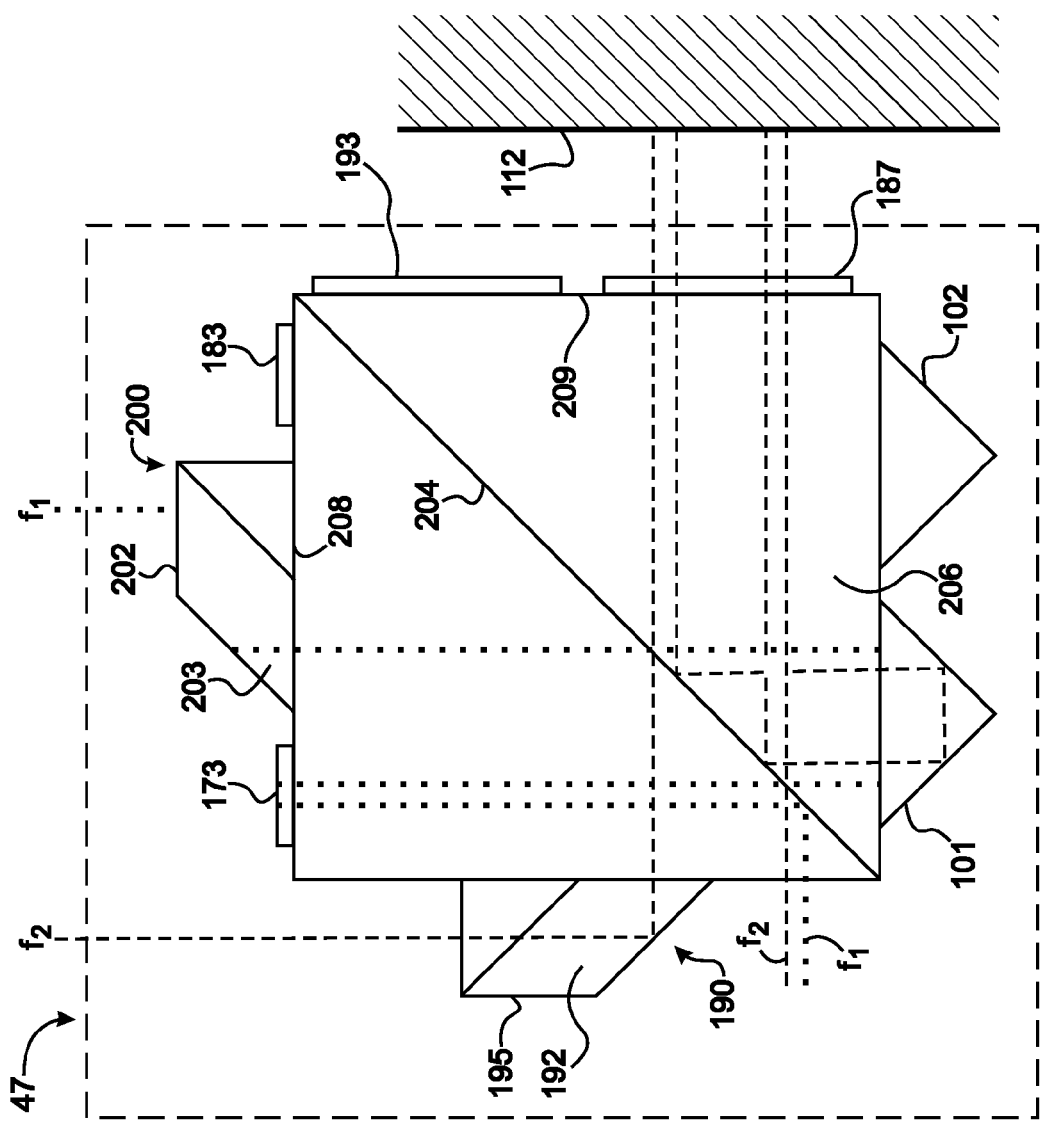
FIG. 5 shows one embodiment of a double-pass displacement measuring interferometer of the present invention, and the optical paths taken by reference and measurement beams therethrough.

FIG. 5 shows one embodiment of a dual-pass plane mirror amplitude-splitting non-polarizing beam splitter of the present invention, and the optical paths taken by reference and measurement beams therethrough. The embodiment of the present invention shown in FIG. 5 includes first and second amplitude-splitting non-polarizing input rhomb sub-assemblies 200 and 190 for receiving spatially-separated input reference and measurement beams $f_1$ and $f_2$, respectively, which are provided by, for example, an isolator of the type shown in FIG. 2 (isolator 35). Amplitude-splitting non-polarizing interfaces 195 and 202 transmit and reflect respective portions of input beams $f_1$ and $f_2$. Polarizing beam splitter interface 204 of polarizing beam splitter sub-assembly 206 acts to block and reflect, or pass, vertically- or horizontally-polarized beams (or P- or S-polarized beams) incident thereon.

Quarter wave plates 173, 183 and 193 are coated with a highly reflective coating to induce state of polarization changes upon beams incident thereon and reflected therefrom. Quarter wave plate 187 is coated with an anti-reflective coating to facilitate efficient transmission of measurement beam $f_2$ therethrough. Quarter wave plates 173 and 187 are configured to receive and reflect or transmit measurement beam $f_2$, while quarter wave plates 183 and 193 are configured to receive and reflect reference beam $f_1$.

In place of measurement cube corner 110 shown in FIG. 2, in a dual-pass embodiment of the present invention illustrated in FIG. 5, measurement mirror 112 is provided. Note that unlike the embodiment of the present invention illustrated in FIG. 2 where measurement cube corner 110 is provided, plane mirror 112 may be translated along a vertical axis while maintaining the measurement accuracy of interferometer 47. Additionally, cube corners 101 and 102 are included in the dual-pass embodiment of the present invention illustrated in FIG. 5 to provide functionality equivalent to that provided by a classic dual pass plane mirror interferometer.

Input rhomb sub-assemblies 200 and 190, polarizing beam splitter sub-assembly 206, and quarter wave plates 173, 183, 187 and 193 each preferably comprise stacks of appropriately machined (or otherwise formed) and coated glass plates as described in U.S. Pat. No. 6,542,247 to Bockman. Faces 203 and 208, 192 and 207, 171 and 209, and 181 and 209 of such sub-assemblies are preferably adhered, glued or otherwise attached or secured next to one another, also as described in U.S. Pat. No. 6,542,247 to Bockman. Accordingly, and consistent with the definition of the term "monolithic" set forth hereinabove, dual-pass interferometer 47 shown in FIG. 5 is monolithic.

While Schott BK-7 glass has been determined to be a particularly well-suited glass for monolithic interferometers of the type described herein, optically-suitable materials other than glass may be employed to construct the input rhomb and polarizing beam splitter sub-assemblies of the present invention. As described above, the present invention may be employed in single- or dual-pass interferometers, as well as in interferometers having three or more optical axes. Laser sources other than helium-neon sources may also be employed in various embodiments of the present invention. Moreover, the various structures, architectures, systems, assemblies, sub-assemblies, components and concepts disclosed herein may be employed in non-monolithic interferometers.

Accordingly, some claims presented herein are not intended to be limited to monolithic embodiments of the present invention, while other claims are not intended to be limited to the various embodiments of the present invention that are explicitly shown in the drawings or explicitly discussed in the specification hereof.

We claim:

1. A interferometer assembly, comprising:
   a first input rhomb sub-assembly having a first input surface and a first output surface, a first amplitude-splitting non-polarizing interface being disposed therewithin;
   a second input rhomb sub-assembly having a second input surface and a second output surface, a second amplitude-splitting non-polarizing interface being disposed therewithin;
   a polarizing beam splitter sub-assembly comprising at least first, second and third faces and having a polarizing beam splitter interface located therewithin;
   wherein the first output surface of the first input rhomb sub-assembly is attached to the first face of the polarizing beam splitter sub-assembly, the second output surface of the second input rhomb sub-assembly is attached to the second face of the polarizing beam splitter sub-assembly, the input rhomb and the polarizing beam splitter sub-assemblies being configured and attached to one another to permit first and second beams having first and second frequencies, respectively, to enter the interferometer assembly spatially separated through the first and second input surfaces, respectively, the first and second amplitude-splitting non-polarizing interfaces splitting the first and second beams.

2. The interferometer assembly of claim 1, further comprising a first quarter wave plate having a first input face.

3. The interferometer assembly of claim 2, wherein the first input face of the first quarter wave plate is attached to the third face of the polarizing beam splitter sub-assembly.

4. The interferometer assembly of claim 1, further comprising a second quarter wave plate having a second input face.

5. The interferometer assembly of claim 4, wherein the second input face of the second quarter wave plate is attached to the third face of the polarizing beam splitter sub-assembly.

6. The interferometer assembly of claim 1, wherein the interferometer assembly is configured to operate as a single-pass interferometer.

7. The interferometer assembly of claim 1, wherein the interferometer assembly is configured to operate as a dual-pass interferometer.

8. The interferometer assembly of claim 1, wherein the interferometer assembly is configured to operate as an interferometer having three or more optical axes.

9. The interferometer assembly of claim 1, wherein the interferometer assembly further comprises at least one cube corner for reflecting at least one of a measurement beam and a reference beam.

10. An interferometer assembly comprising first and second input rhomb amplitude-splitting non-polarizing sub-assemblies, and a polarizing beam splitter sub-assembly, the first and second input rhomb sub-assemblies being configured to receive, transmit and reflect by amplitude-splitting means spatially separated first and second beams, respectively, the first and second beams having first and second frequencies, output beams from the input rhomb assemblies being directed into the polarizing beam splitter and a polarizing beam splitter interface disposed therewithin.

11. The interferometer assembly of claim 10, further comprising a first quarter wave plate attached to the polarizing beam splitter sub-assembly, the first quarter wave plate being configured to receive and reflect the first beam.

12. The interferometer assembly of claim 10, further comprising a second quarter wave plate attached to the polarizing beam splitter sub-assembly, the second quarter wave plate being configured to receive and transmit the second beam.

13. The interferometer assembly of claim 10, wherein at least one of the first input rhomb sub-assembly and the second input rhomb sub-assembly comprises first and second volumes of optical-grade glass glued together along first and second surfaces, the glued interface between the first and second surfaces forming an amplitude-splitting interface.

14. The interferometer assembly of claim 10, further comprising at least a third input rhomb amplitude-splitting non-polarizing sub-assembly for receiving a third beam, the third beam having a frequency different from the first and second beams.

15. The interferometer assembly of claim 10, wherein the assembly is monolithic.

16. A method of making an interferometer assembly, the method comprising:
providing a first input rhomb sub-assembly having a first input surface and a first output surface, a first amplitude-splitting non-polarizing interface being disposed therewithin;
providing a second input rhomb sub-assembly having a second input surface and a second output surface, a second amplitude-splitting non-polarizing interface being disposed therewithin;
providing a polarizing beam splitter sub-assembly comprising at least first, second and third faces and having a polarizing beam splitter interface located therewithin;
attaching the first output surface of the first input rhomb sub-assembly directly to the first face of the polarizing beam splitter sub-assembly;
attaching the second output surface of the second input rhomb sub-assembly directly to the second face of the polarizing beam splitter sub-assembly;
wherein the input rhomb and the polarizing beam splitter sub-assemblies are configured and attached to one another to permit first and second beams having first and second frequencies, respectively, to enter the interferometer assembly spatially separated through the first and second input surfaces, respectively, the first and second amplitude-splitting non-polarizing interfaces being configured to split the first and second beams.

17. The method of claim 16, wherein the first output surface is glued to the first face.

18. The method of claim 16, wherein the second output surface is glued to the first face.

* * * * *